United States Patent [19]

Nix et al.

[11] Patent Number: 4,660,694

[45] Date of Patent: Apr. 28, 1987

[54] PREFILLED HYDRAULIC CONTROL APPARATUS FOR MOTOR VEHICLE MECHANICAL CLUTCH

[75] Inventors: Richard A. Nix; Charles A. Kassin, both of Utica; Keith V. Leigh-Monstevens, Troy, all of Mich.

[73] Assignee: Automotive Products plc, Warwickshire, England

[21] Appl. No.: 709,088

[22] Filed: Mar. 7, 1985

[51] Int. Cl.[4] .................... F16D 23/14; F16D 25/08
[52] U.S. Cl. ............................ 192/85 CA; 192/91 A; 192/98
[58] Field of Search .................... 92/128; 60/533; 192/85 CA, 91 A, 98

[56] References Cited

U.S. PATENT DOCUMENTS

| 2,967,396 | 1/1961 | Staadt | 192/91 A X |
| 3,004,438 | 10/1961 | Funk et al. | 192/85 CA X |
| 4,560,051 | 12/1985 | Brandenstein et al. | 192/85 CA X |

FOREIGN PATENT DOCUMENTS 904380 2/1954 Fed. Rep. of Germany ... 192/91 A

Primary Examiner—George H. Krizmanich
Attorney, Agent, or Firm—Krass & Young

[57] ABSTRACT

Improvement in a hydraulic control apparatus for assembly on structure to actuate a remotely located mechanism, the apparatus including an actuator having an annular body providing an annular piston chamber therein and an annular piston slidably reciprocable on the body, the actuator being pre-filled with hydraulic fluid and pre-tested prior to being installed on the structure, an annular elastomeric seal axially reciprocable within the piston chamber which liquid-tight seals the hydraulic fluid behind it, the improvement comprising constructing the actuator so that it can be separated into two subassemblies, one being a body subassembly which includes the body and the other being a piston subassembly which includes the piston, the construction of the body being such that its piston chamber is formed at the rear end thereof and the construction of the piston being such that the rear end thereof reaches into the piston chamber and abuts against the seal during functioning of the actuator, the improvement further comprising providing a movement-restraining device for insertion on the body to take the place of the piston when the two subassemblies are separated from each other, the movement-restraining device being constructed so that it is slidable on the body and so that the rear end thereof reaches into the piston chamber and abuts against the seal, the movement-restraining device being forcefully held on the body to hold the seal against axial movement while the actuator is filled with hydraulic fluid.

6 Claims, 7 Drawing Figures

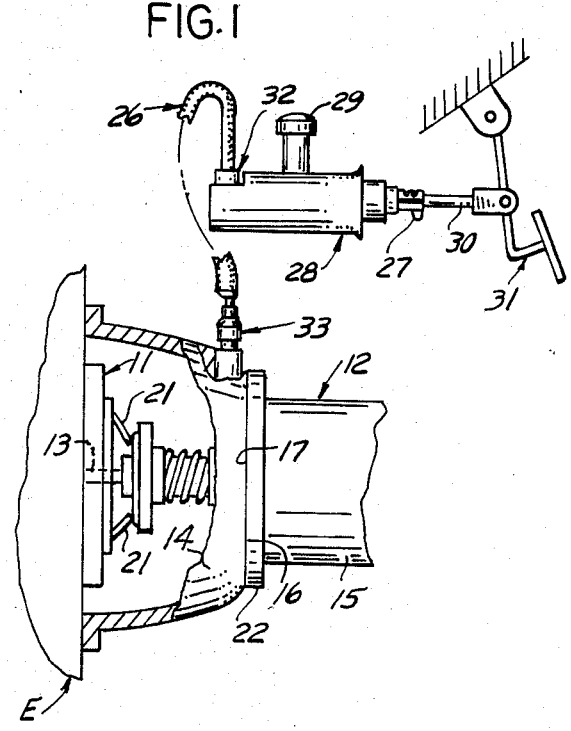
FIG.1
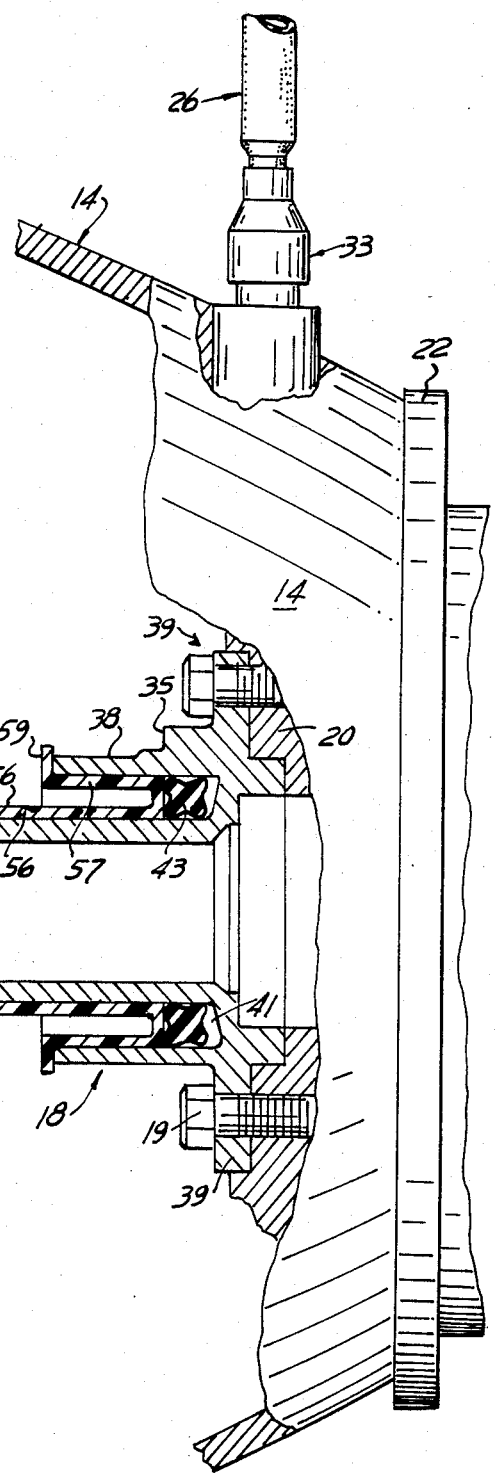
FIG.2
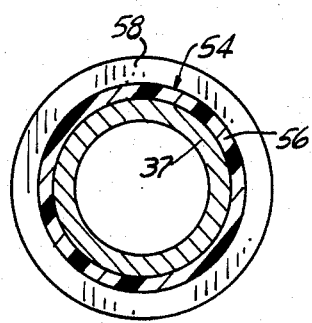
FIG.3
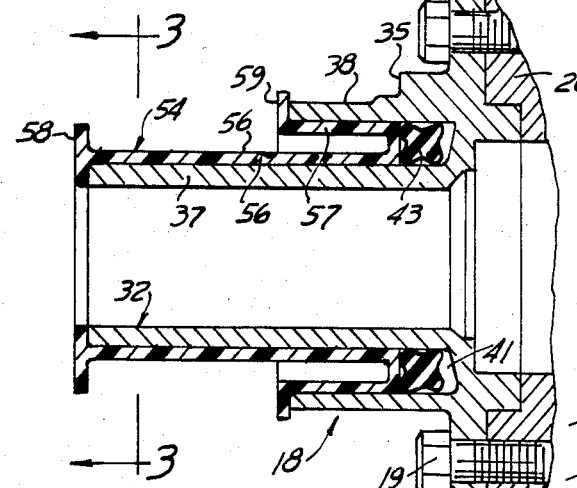

PREFILLED HYDRAULIC CONTROL APPARATUS FOR MOTOR VEHICLE MECHANICAL CLUTCH

BACKGROUND OF THE INVENTION

The present invention relates to motor vehicle clutch control mechanisms in general, and more particularly to a hydraulic clutch control apparatus for a vehicle friction clutch having a slave cylinder for operating the clutch release mechanism remotely from a master cylinder. The hydraulic control mechanism is pre-filled with hydraulic fluid and pre-tested prior to shipment to a motor vehicle manufacturer for installation in a motor vehicle.

It is now known to pre-fill with hydraulic fluid a motor vehicle hydraulic clutch control apparatus comprising a master cylinder, a reservoir of fluid and a slave cylinder for operating the throw-out bearing of a mechanical diaphragm spring clutch as disclosed in U.S. Pat. Nos. 4,454,632, 4,407,125, and 4,599,860, all assigned to the same assignee as the present application. In addition, U.S. Pat. Nos. 4,503,678, 4,506,107, 4,585,106, 4,585,107, 4,585,108, and 4,585,109, all assigned to the same assignee as the present application, also disclose diverse forms of pre-filled hydraulic control mechanisms for motor vehicle clutches. Also, co-pending application Ser. Nos. 537,869 filed Sept. 30, 1983, and 555,667, filed Nov. 28, 1983 all assigned to the same assignee as the present invention, disclose improvements pertaining to the slave cylinder for such hydraulic clutch control apparatus.

Pre-filled and pre-tested hydraulic apparatus for operating motor vehicle mechanical clutches presents many advantages for the motor vehicle manufacturer including receiving a fully assembled mechanism comprising all of the components pre-filled and pre-tested for operability and ready to be installed as one or more subassemblies on a motor vehicle during final assembly thereof.

SUMMARY OF THE INVENTION

The present invention remedies certain inconveniences with respect to preassembled pre-filled hydraulic clutch control apparatus for motor vehicle mechanical clutches, more particularly in structures wherein the throw-out bearing is operated by a concentric annular slave cylinder, while presenting all the advantages of pre-filled pre-tested clutch control apparatus. Such results are achieved by providing improvements in pre-tested and pre-filled hydraulic clutch control apparatus pertaining to the slave cylinder and by which the piston means thereof can be removed from the cylinder body and the two can be furnished to a motor vehicle manufacturer as separate subassemblies. The piston means subassembly includes the throw-out bearing and the take-up spring for the vehicle clutch and the cylinder body subassembly includes the piston chamber, the seal therefor and a movement-restraining device which allows the cylinder body subassembly to be maintained pre-filled with hydraulic fluid. Such clutch control apparatus can be fully tested with the slave cylinder fully assembled prior to separation of the two subassemblies.

These and other objects of the present invention will become apparent to those skilled in the art when the following description of an example of the best mode contemplated at the present for practicing the invention is read in conjunction with the accompanying drawing wherein like reference numerals refer to like parts, and in which:

BRIEF DESCRIPTION OF THE DRAWING

FIG. 1 is a schematic illustration, partly in section, of a hydraulic clutch control apparatus having an example of structure of concentric slave cylinder according to the present invention;

FIG. 2 is an enlarged view, partly in section, similar to that of FIG. 1 but showing the cylinder body subassembly separate from the piston means subassembly;

FIG. 3 is a transverse sectional view of the structure of FIG. 2 taken on the line 3—3 thereof;

DETAILED DESCRIPTION OF THE EMBODIMENTS SHOWN

Figure 4:
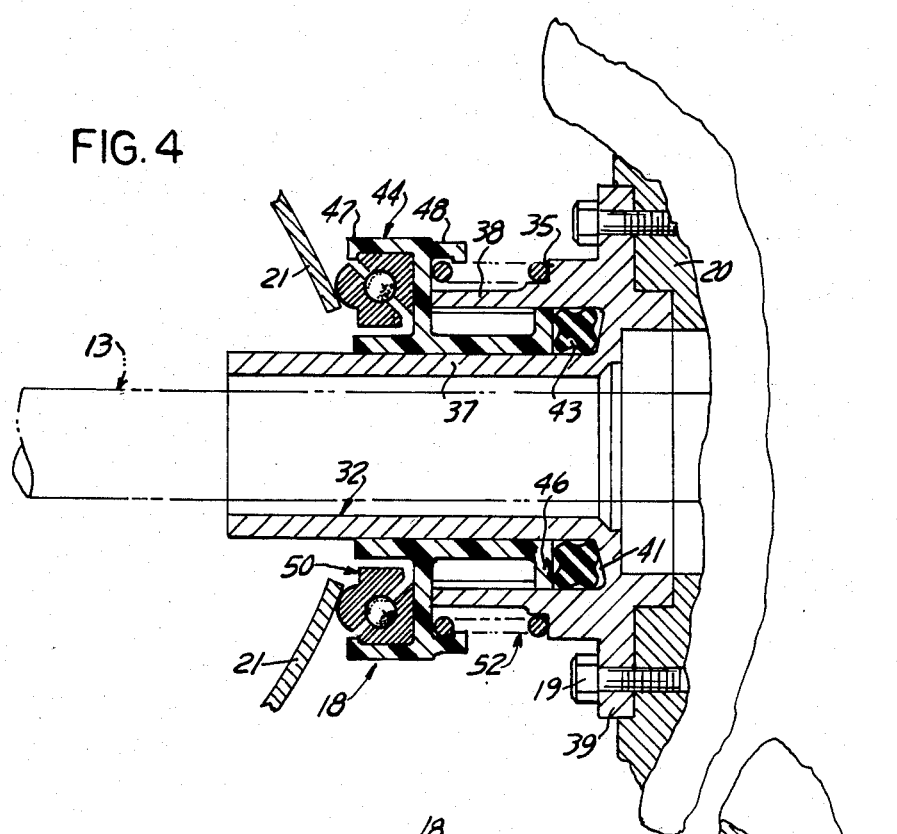
FIGS. 4 and 5 are respective longitudinal sectional views showing the slave cylinder fully assembled and in its two extreme positions.
Figure 5:
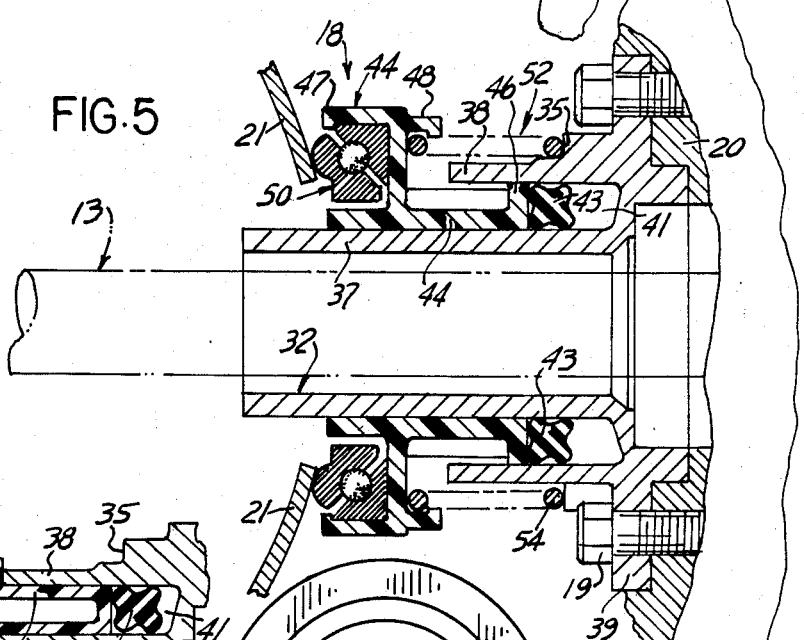

Referring to the drawing in greater detail and first to FIGS. 1–5, a motor vehicle transmission is schematically illustrated, FIG. 1, as comprising a friction clutch assembly 11 and a gearbox or transmission 12 enclosed in a casing or housing 15 having a flange 22 on the front end thereof, as shown. A transmission input shaft 13 drives the gearbox 12 from rotary power transmitted to it by the clutch assembly 11. A bell housing 14, surrounding the clutch assembly 11, is bolted on the rear face of the motor vehicle engine, designated "E". The rear face 16 of the bell housing 14 is bolted to the front face 17 of the gearbox casing flange 22. A hydraulic concentric slave cylinder, generally designated 18, is disposed around the input shaft 13 within the bell housing 14 for forcefully reciprocating the vehicle clutch throw-out bearing which actuates the diaphragm spring fingers of the clutch assembly 11. Projecting fingers of the diaphragm spring are shown and indicated at 21 in FIGS. 1, 4 and 5. In the example of structure illustrated, the slave cylinder 18 is cast into a one-piece body, designated 32, which is provided with projecting inner and outer tubular portions 37 and 38, respectively, and a rear mounting flange 39. A forward-facing radial shoulder 35 is formed on the slave cylinder body outwardly of the outer tubular portion 38 for purposes which will be mentioned, infra. The slave cylinder body may be bolted, as shown at 19, via its rear flange 39, to the front end plate 20 of the vehicle transmission or, in the alternative, may be bolted to the rear face of the clutch bell housing 14 or may be cast integral with the transmission end plate 20 or with the rear face of the clutch bell housing 14, all as described in the aforementioned co-pending applications Ser. Nos. 537,869 and 555,667. In any case, when the motor vehicle is finally assembled, the input shaft 13 projects rearwardly from the clutch assembly 11 through both the slave cylinder 18 and the end plate 20 into the vehicle transmission, as shown in FIGS. 4 and 5.

The slave cylinder 18 is connected, via a hydraulic fluid conduit 26, to a master cylinder 28, FIG. 1. The master cylinder 28 is provided with a built-in hydraulic fluid reservoir 29 and has an input rod 30 pivotally connected at its outer end to a clutch control pedal 31 installed within the driver compartment of a motor vehicle, not shown. The inner end of the rod 30, as is well known, is connected to a piston, not shown, reciprocably disposed inside of the master cylinder 28 for displacing hydraulic fluid through the line 26 to the slave cylinder 18 when the clutch pedal 31 is depressed. As shown and described in one or more of the aforementioned co-pending applications, a removable locking clip 27 holds the input rod 30 in its extended position until after installation of the master cylinder 28 on the motor vehicle. The line 26 is a flexible conduit or hose having a connector 33 on one end for connection to the inlet of the slave connector 18 and having another connector 32 on the other end for connection to the outlet of the master cylinder 28. The connector 33 is a leak-proof quick-connect type connector which maintains the integrity of the pre-filled and pre-tested hydraulic clutch control apparatus even after "breaking" of such connector 33 to separate the slave cylinder 18 from the conduit 26 and master cylinder 28, as shown and described in copending application Ser. No. 555,667 assigned to the same assignee as the present invention.

In the example of structure of slave cylinder illustrated, the inner and outer tubular portions 37 and 38 form an annular piston chamber 41 therebetween which is filled with hydraulic fluid (in communication with that in the conduit 26 and master cylinder 28) and sealed at the front end thereof by an elastomeric star-shaped annular seal 43. The seal 43 is reciprocable within the piston chamber 41 and liquid-tight seals the hydraulic fluid behind it. The inner tubular portion 37 is elongated axially in respect to the outer tubular portion 38 and slidably supports thereon the aforementioned piston means for the slave cylinder 18. Such piston means, generally designated 44, is an annular structure having a hollow tubular portion 56 which, via its I.D., slidably engages the O.D. of the inner tubular portion 37. The rear end of the piston means 44 is constructed to operate in the piston chamber 41 and for this purpose, is provided with a radially projecting cylinder flange 46 which abuts against the seal 43 and, via its O.D., engages the I.D. of the outer tubular portion 38. The front end of the piston means 44 is constructed as a combination bearing-carrier and spring-holder and, for these purposes, is provided with a radially projecting wall formed integrally with the tubular portion 44. At its O.D., such radial wall is provided with forwardly and rearwardly projecting portions 47 and 48, respectively, each of which has a radially inwardly projecting retention lip, as shown. The wall portion 47 forms an annular forward-facing cavity for holding therein an annular throw-out bearing 50 for the vehicle clutch. The throw-out bearing 50 is snapped past the respective retention lip on the wall portion 47 and, on its inner race, has an annular rounded front nose portion which abuts against the aforementioned diaphragm spring fingers 21 of the clutch assembly 11. The wall portion 48 forms an annular rear-facing cavity for holding therein a compression spring, designated 52, which serves, as is well known, as a take-up spring for maintaining the throw-out bearing 50 in continual engagement with the spring fingers 21 as wear occurs on the friction plate of the clutch assembly 11 during use of the vehicle. The front end of the compression spring 52 is snapped past the respective retention lip on the wall portion 48 so that the spring 52 forms an operative part of the piston means subassembly.

In accordance with the present invention, the cylinder body subassembly includes a movement-restraining device, generally designated 54, which is installed on the cylinder body 32 in lieu of the piston means 44. Such movement-restraining device 54 or dummy piston, comprises an elongated double-walled hollow body having inner and outer tubular portions 56 and 57, respectively, integrally joined together by an annular radially extending rear wall, as shown. The inner wall 56 is elongated axially in respect to the outer wall 57 and slidably fits over the inner tubular portion 37, with which, via its I.D., it forms a near interference fit with the O.D. of such tubular portion 37. The forward ends of the inner and outer walls 56 and 57 are formed, as shown, with radially directed lips 58 and 59, respectively, which abut against the front faces of the inner and outer tubular portions 37 and 38, respectively. A portion of the lip 58 projects radially outwardly of the inner wall 56 to serve as a handle for removing the restraining sleeve 54 from the cylinder body 32 when desired. The outer wall 57, via its O.D., forms a near interference fit with the I.D. of the outer tubular portion 38 and to such extent that the outer wall 57 flexes radially inwardly toward the inner wall 56 when the device 54 is installed on the cylinder body 32. The device 54 is thus forcefully held on the slave cylinder body 32 and, in turn, holds the seal 43 against axial movement while the piston chamber is filled with hydraulic fluid. When it is desired to fully assemble the slave cylinder 18, the device 54 is pulled off the front end of the tubular portion 37, and in lieu thereof, the piston means subassembly 44 is installed thereon. The body of the piston means subassembly 44 is inserted over the inner tubular portion 37 and pushed axially rearwardly thereof so that the flange 46 on the piston body enters the piston chamber 41 and so that the rear end of the take-up spring 52 engages the aforementioned shoulder 35 on the slave cylinder body. As previously mentioned, the front nose portion of the throw-out bearing 50 engages the diaphragm spring fingers 21 of the clutch assembly 11 when the slave cylinder 18 is fully assembled and installed on a motor vehicle.

Figure 6:
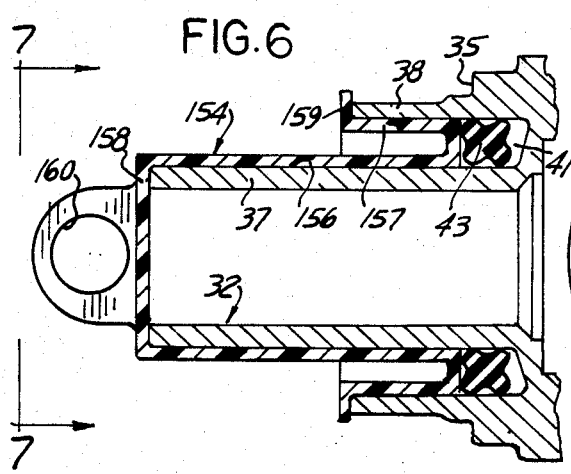
FIG. 6 is a view similar to FIG. 2 but showing a modification of the movement-restraining device for the cylinder body subassembly.
Figure 7:
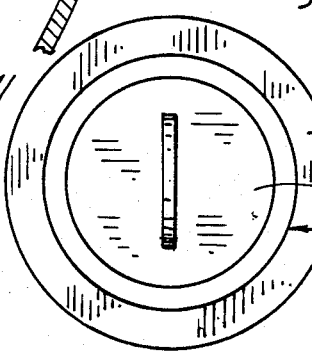
FIG. 7 is an end elevational view of the structure of FIG. 6 taken on the line 7—7 thereof.

Referring now to FIGS. 6 and 7, a modification of the movement-restraining device for the slave cylinder subassembly 32 is shown and designated 154. The device 154 is constructed similarly to the device 54 so that similar parts thereof are designated 156, 157, etc. The device 154 is formed with a full wall on its front end which completely closes off the front end of the inner tubular portion 37. A forwardly projecting handle having a finger-grip aperture 160 formed therein is integrally formed, as shown, with such full front wall of the restraining sleeve 154.

Having thus described the present invention by way of an example of structure well designed to accomplish the objects of the invention, modifications whereof will be apparent to those skilled in the art, what is claimed as new is as follows:

1. A two-part pre-filled hydraulic actuator assembly comprising first and second subassemblies, said first subassembly comprising a cylinder having a closed end and an open end having an edge, a sealing member disposed in said cylinder and facing the closed end of said cylinder with a chamber defined between said sealing member and the closed end of said cylinder, means for introducing fluid into said chamber and for withdrawing fluid from said chamber, and a dummy piston disposed in said cylinder behind said sealing member, said dummy piston forming an interference fit in said cylinder, said dummy piston having a first end portion projecting through the open end of said cylinder and a second end portion in engagement with said sealing member for maintaining said sealing member in said cylinder during filling of said chamber with fluid, said first portion of said dummy piston projecting from said cylinder and comprising graspable means for pulling said dummy piston from said cylinder prior to interconnecting said first and second subassemblies; said second subassembly comprising a working piston reciprocal in said cylinder in response to introduction of fluid into said chamber, whereby said first and second subassemblies may be supplied to the user with said dummy piston disposed in said cylinder behind said sealing member whereafter, following installation of said first subassembly, said dummy piston may be grasped and removed from said cylinder with said annular seal functioning to preclude leakage of fluid from said chamber whereafter said working piston may be introduced into said cylinder through the open end of said cylinder.

2. The improvement of claim 1 wherein said dummy piston includes abutment means in engagement with the edge of the open end of said cylinder for locating the second portion of said dummy piston in engagement with said sealing member.

3. The improvement of claim 1 wherein the first portion of said dummy piston projecting from the open end of said cylinder comprises a flange defining said graspable means.

4. The improvement of claim 2 wherein the first portion of said dummy piston projecting from the open end of said cylinder comprises a flange defining said abutment means.

5. The improvement of claim 1 wherein the first portion of said dummy piston projecting from the open end of said cylinder is in the form of a tang defining said graspable means.

6. The improvement of claim 1 wherein said cylinder, said piston, said seal member and said dummy piston are each annular shaped.

* * * * *